(12) United States Patent
Smolenskiy

(10) Patent No.: US 6,581,394 B1
(45) Date of Patent: Jun. 24, 2003

(54) AIR-BASED REFRIGERATION SYSTEM

(75) Inventor: Boris Smolenskiy, Chicago, IL (US)

(73) Assignee: Jacob Bletnitsky, Skokie, IL (US)

( * ) Notice: Subject to any disclaimer, the term of this patent is extended or adjusted under 35 U.S.C. 154(b) by 0 days.

(21) Appl. No.: 09/890,713

(22) PCT Filed: Dec. 7, 1999

(86) PCT No.: PCT/US99/28936
§ 371 (c)(1),
(2), (4) Date: Aug. 3, 2001

(87) PCT Pub. No.: WO01/42724
PCT Pub. Date: Jun. 14, 2001

(51) Int. Cl.[7] .............................. F25B 9/00; F25D 9/00

(52) U.S. Cl. ........................................ 62/172; 62/402

(58) Field of Search ............................ 62/172, 93, 94, 62/86, 401, 402

(56) References Cited

U.S. PATENT DOCUMENTS

| | | | | |
|---|---|---|---|---|
| 4,374,469 A | * | 2/1983 | Rannenberg | 62/402 |
| 4,876,856 A | * | 10/1989 | Iishiki et al. | 60/651 |
| 5,086,622 A | * | 2/1992 | Warner | 62/402 |
| 5,438,845 A | * | 8/1995 | Kirschner et al. | 62/172 |
| 5,699,672 A | * | 12/1997 | Foerster et al. | 62/402 |
| 5,718,116 A | * | 2/1998 | Grassi et al. | 62/402 |
| 5,921,093 A | * | 7/1999 | Jonqueres | 62/402 |

* cited by examiner

Primary Examiner—Chen-Wen Jiang
(74) Attorney, Agent, or Firm—Boris Parad; Parad Law Offices, P.C.

(57) ABSTRACT

A refrigerating method and system using compressed, filtered, dehumidified, turbo expanded and re-circulated air for the enclosed refrigerated environment. Compressed air passes via a series of moisture-removal devices (12, 24, 32), dust filter (52), heat exchanger (60), turbine expander (65), impeller fan (92), vacuum refrigeration chamber (70) and muffler (98).

17 Claims, 1 Drawing Sheet

AIR-BASED REFRIGERATION SYSTEM

BACKGROUND OF THE INVENTION

This invention relates to subzero refrigeration and cooling systems using compressed air as a coolant instead of environment-damaging and expensive systems using freon, liquid nitrogen, ammonia or other substances.

The inventor was experimenting with the air-based refrigerating devices for more than thirty years. This honing and fine tuning process has resulted in the present invention. The prior art is replete with refrigeration devices employing air for heat transfer. For example, U.S. Pat. No. 5,438,845 by Kirschner et al. discloses a refrigeration device with compressed and turbo expanded air based on a venturi-like ejector circulating the refrigerant within the refrigeration chamber.

U.S. Pat. No. 4,430,867 by Warner disclosed an air cycle refrigeration system for aircraft cabins including a sink and circulation heat exchangers for melting ice in the exhaust air and exhaust air from the system's turbine.

U.S. Pat. No. 5,718,116 by Grassi at al. disclosed an open loop, air refrigerant, heat pump process for a food freezer employing cold expander discharge to cool air feed to the expander prior to suing this portion as a regeneration gas for adsorbent-containing drier.

U.S. Pat. No. 4,829,775 by Defrancesco disclosed an air-conditioning system with a filter of compressed air coming from a heater and passing through a second re-heater downstream of the filter and upstream of the turbine for maximizing efficiency of the turbine.

U.S. Pat. No. 5,699,672 by Foerster et al. revealed a refrigeration apparatus and method in which compressed air is subjected to isothermal compression in a water-injected screwtype compressor with subsequent adiabatic and isentropic expansion in a high-speed turbine.

U.S. Pat. No. 5,921,093 by Jonqueres disclosed an air cycle system using a re-heater condensing water vapor extracted from compressed air and then cooled by a sub-cooler heat exchanger and re-heated in the re-heater condenser before its expansion in a turbine for enclosure conditioning.

However, none of the prior art references known to the inventor discloses the present invention shown and described herein.

SUMMARY OF THE INVENTION

A novel system and method employing compressed air as primary refrigerant dramatically reduces exploitation cost, increases efficiency and produces pollution-free discharge in contradistinction with existing systems using freon, liquid nitrogen or other chemical substances. Compressed air travels through three dehumidifying steps including a passage through a pre-cooler for initial dehumidification, moisture separator, and dryers regenerated by independent heaters or system exhaust air drying off the moisture-absorbing material. Then, the air travels through a dust filter, turbine expander, refrigeration chamber with a sinusoidal path channel, impeller fan, heat exchanger and a noise-attenuating muffler. The unique design resolves technical problems previously preventing mass production of noise-free and inexpensive air-based refrigeration systems.

BRIEF DESCRIPTION OF THE DRAWINGS

A schematic illustration of one embodiment of an air-based refrigeration system in accordance with the present invention is shown in FIG. 1.

DESCRIPTION OF THE INVENTION

Figure 1:
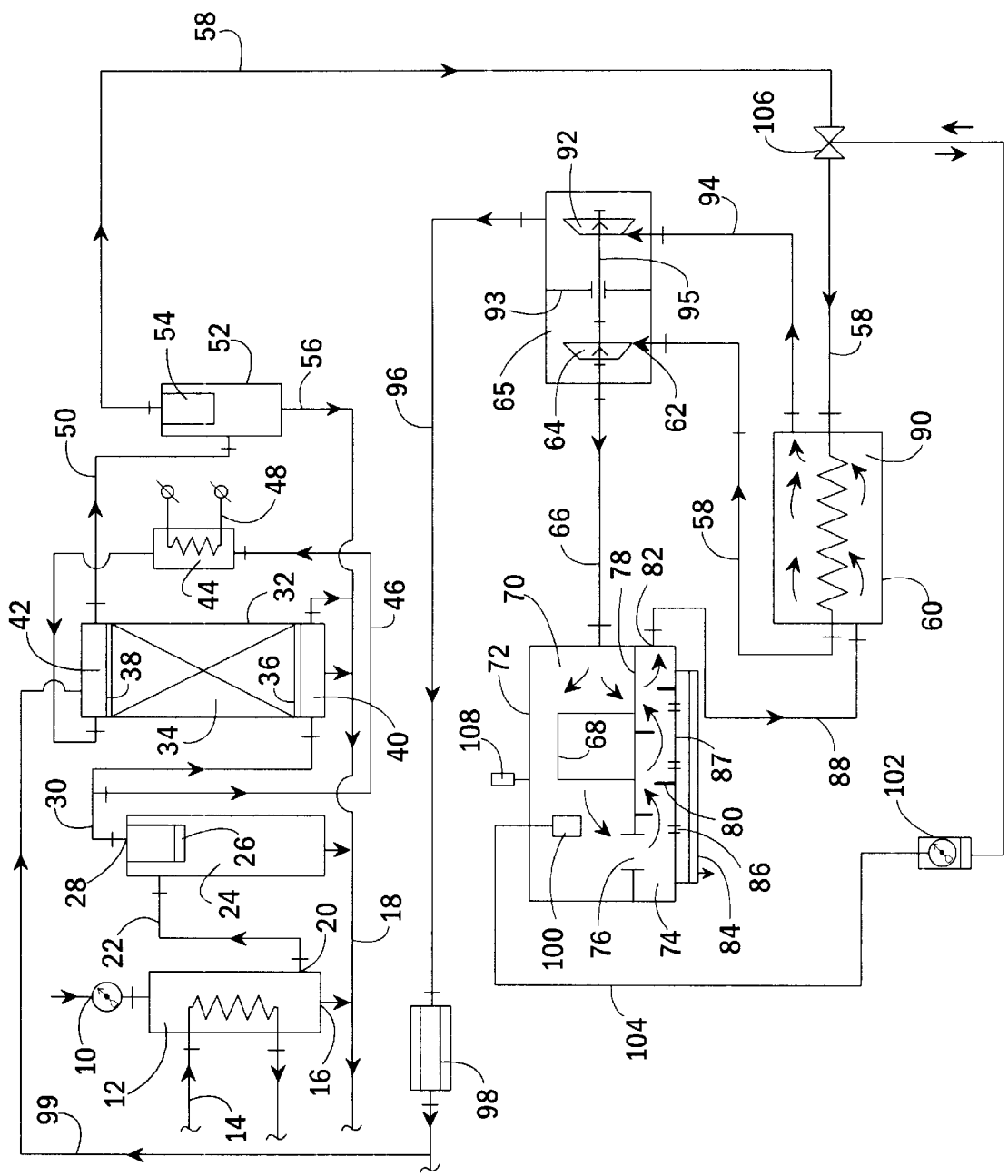

As shown in FIG. 1, a refrigeration system comprises a compressed air line 10 conveying air from a standard compressor to an air pre-cooler 12. The compressed air temperature is about 70° to 80° C. A tap water line 14 passes through the air pre-cooler 12 in order to chill out the hot compressed air. The temperature of the tap water is about 18–20° C. or lower. The tap water coils or pipelines 14 cool the air traveling through the air pre-cooler 12, thereby dehumidifying that air. Condensate descending down the walls leaves the air pre-cooler through an outlet 16 at or slightly above the atmospheric pressure. A condensate line 18 starting from the outlet 16 ends in a drain sump (not shown) or discharged into the ambient atmosphere.

The air leaves the pre-cooler through an outlet 20. This completes the initial stage of air dehumidification. A cooled air conduit 22 connects the air pre-cooler with a moisture or water extractor 24 for the next stage of dehumidification. The air propelled into the water extractor 24 passes through a moisture separator cylinder 26. The cylinder 26 has an entry screen blocking the vaporized water and oil droplets from entering an outlet 28 leading to a conduit 30. This completes the second phase of air dehumidification. The water condensate accumulated on and flowing down the walls is removed from the moisture extractor 24 through a port 31 in the same manner and through the same condensate drainage system 18 as the air pre-cooler condensate.

The conduit 30 brings the air still laden with water and oil vapor to an air dryer 32 for final dehumidification. The air dryer 32 is interconnected with one or more of identical backup dryers to insure the system's continuous operation during a downtime of one of them. Each of these dryers 32 includes a drying sand-like column 34 of silica gel or similar moisture-absorbing material.

An air entry screen 36 supports the column 34. A lid screen 38 compacts and retains the drying material or absorber inside the dryer. The lid 38 applies continuous and constant pressure on the absorber column. This unidirectional pressure can be achieved either by a spring-loaded or weight-bearing lid. Compressed air comes into an air entry chamber 40 preceding the absorber support screen 36 and then moves through the absorber column 34, which absorbs the remaining water and oil vapor.

An exit chamber 42 collects the air forced through the absorber column 34. The absorber crumbles into dust in time. This dust is carried away by airflow. The dryer must be periodically refilled with fresh absorber. The absorber becomes moisturized eventually and needs to be dried up for its further exploitation. This drying or regeneration process is accomplished during one dryer's maintenance (regeneration) stops by heated air coming from an independent heater 44 or hot air exiting from the subject system. The heater 44 receives the air from the moisture extractor 24 through a line 46 connected to the conduit 30, heats the air with its electric heating elements 48 and discharges the heated air into the dryer's exit chamber 42 through a line 49. The hot air is forced to move down from the exit chamber 42 toward the support screen 36, i.e. in a reverse-to-normal flow direction. Then this air is exhausted into the drainage system 18 through the outlet pipes.

When the absorber drying process is finished, the dryer 32 is ready to resume its operation and take over the backup dryer switched over during this dryer's silica gel regeneration stop. The air dehumidified by the dryer 32 is exhausted into a line 50 leading to a dust filter 52. The dust filter 52 has a metal screen 54 with tiny apertures (approximately 0.0016 mm in diameter) preventing the entry of suspended absorber dust into the air system. This air filtering process reduces abrasion and jamming of a turbine expander rotated by the air, thereby increasing the expander's working life and reliability. Dust caught by the dust filter 52 is removed through the combined drainage system 18 through lines 56.

An air pipe 58 brings the filtered and dried air to a heat exchanger 60 for cooling and reducing the air medium temperature. The cooled, dried and cleaned air is ejected through injector nozzles 62 into a turbine 64. The ejected air rotates the turbine blades and generates cold due to the adiabatic expansion of compressed air losing its speed and pressure. The refrigerated air, supplied by the turbo expander 65 via an inlet line 66, absorbs heat load from the items or objects 68 stored in a chamber 70 of the refrigerator 72. Such items may include food products, airplane elements tested for subzero temperature operation, or lubricants.

Then the air flows into a channel 74 through the opening 76 in the metal floor or partition 78 of the refrigeration chamber 70. The channel 74 guides the air into a sinusoidal or wave-like path by its staggered fins 80, which are attached to the metal partition 78 and channel walls. The sinusoidal path in that channel delays exit of the refrigerated air out of refrigerator and thereby increases efficiency of the air refrigerant cooling the partition 78. This wave-like passage continues until air reaches the refrigerator outlet 82. A waste collector 84 is affixed to the channel 74 for removing of snowflakes or other particles suspended in the exiting air. The collector accumulates waste through a series of openings 86 in the channel wall 87. The refrigerator outlet line 88 delivers the refrigerated air into a cooling chamber 90 of the heat exchanger 60 for cooling off of the air pipelines 58 coming into the turbo expander from the dust filter 52.

The refrigerated air is then drawn out of the exchanger chamber 90 and ejected onto the blades of an impeller fan 92 through the conduit 94. The fan can create a vacuum in the refrigeration chamber, because it is more powerful than the turbine 64 supplying the refrigerated air to the chamber. The impeller fan 92 is sharing its shaft 95 with the turbine 64. A wall 93 separates an impeller chamber and a turbine expander 65. The fan 92 compresses the air to the higher than atmospheric pressure and releases it into the atmosphere through a line 96 and muffler 98. The hot air exiting the muffler can be also directed into the dryer for drying the absorber through the line 99. This re-circulation process saves energy by reducing the need for the heater 44. The muffler 98 attenuates the noise (approximately 400–500 decibels) of turbine expander exiting air without causing any significant frictional resistance to the airflow and reduction of the turbo expander's power.

Temperature in the refrigeration chamber 70 fluctuates within 0.5° C. The system can produce refrigeration temperature up to −135° C. or lower. Selected temperature level is maintained by controlling means including a refrigerator chamber thermometer-sensor 100 connected to a controller 102 by a signal line 104. The controller generates signals to an air valve 106 for adjusting airflow supplied to the turbo expander 64 via the line 58. The controlling means can automatically shut down the airflow and the turbine, or restart the compressed air-refrigerant supply depending on the refrigerator chamber temperature or commercial needs. A pressure relief valve 108 has a dual function of releasing air from the refrigerator when the inside pressure exceeds a predetermined level. The valve 108 also lets the outside air enter the refrigerator when the vacuum pressure reaches a certain level.

A turbine expander temperature differential between the entering and exiting air is set at −60° C. If the air initially entering the turbine expander is about 20° C., then the temperature of the air coming off the turbine expander will be approximately −40° C. The air further cools down to about −60° C. during regular operation of the expander. The temperature of the air entering the expander 64 after the start up will be continuously decreased by the heat exchanger 60. For instance, if the temperature of the air entering the heat exchanger 60 is reduced by the refrigerated air exiting from the refrigeration chamber 70 to 5° C., then the temperature of the air exiting the turbine expander will be at about −55° C. due to the set differential of −60° C. Maximum operational temperature should not exceed −135° C.

The set temperature differential of −60° C. is reached within 2 to 20 minutes instead of 4 to 5 hours minimum in refrigerators using freon, ammonia and other fluocarbons or hydrofluocarbons as coolants. These coolants or refrigerants also leak through de-hermetized pipe connections and evaporates into the ambient environment and atmosphere. This escape is unavoidable and leading to often replacement of this expensive chemical substance. Such leakage of compressed air would be harmless to health and practically causing no extra expense. Freon or ammonia pollution is detrimental to the health of people and atmosphere. Hydrofluocarbons or fluocarbons refrigerant systems require their defrosting and consequent prolonged downtime of the refrigerator. The air refrigerant on the other hand is ecologically clean, explosion-resistant, fire proof, nontoxic, cheap and fast-cooled to facilitate quick startup of the system. The system needs no downtime for defrosting. The subject air-based system provides continuous or interruptible-on-demand and practically maintenance-free mode of operation.

Although the present invention has been described with reference to a preferred embodiment, it will be understood by those skilled in the art that numerous changes, omissions and additions may be made without departing from the spirit and scope of the subject invention.

I claim:

1. An air-based refrigeration system comprising:

A series of dehumidification devices for sequential removal of oil and water vapor from compressed air;

An air heat exchanger for cooling the dehumidified air by refrigerated air;

A turbine expander for refrigerating the dehumidified air to subzero temperatures;

A refrigerator for taking heat load from the refrigerator-contained items;

An impeller means drawing air out of the refrigeration chamber and into said heat exchanger;

A controlling means for regulating the flow of air into said turbine expander;

Said dehumidification devices comprising a pre-cooler for cooling compressed air with tap water;

Dryer means containing moisture-absorbing material, and

Moisture separator means for blocking the entry of water and oil droplets into a compressed air line.

2. An air-based refrigeration system comprising:

A series of dehumidification devices for sequential removal of oil and water vapor from compressed air;

An air heat exchanger for cooling the dehumidified air by refrigerated air;

A turbine expander for refrigerating the dehumidified air to subzero temperatures;

A refrigerator for taking heat load from the refrigerator-contained items;

An impeller means drawing air out of the refrigeration chamber and into said heat exchanger;

A controlling means for regulating the flow of air into said turbine expander;

Said dehumidification devices comprising a pre-cooler for cooling compressed air with tap water;

Dryer means containing moisture-absorbing material;

Moisture separator means for blocking the entry of water and oil droplets into a compressed air line, and Said moisture separator means including a screen with small openings.

3. An air-based refrigeration system comprising:

A series of dehumidification devices for sequential removal of oil and water vapor from compressed air;

An air heat exchanger for cooling the dehumidified air by refrigerated air;

A turbine expander for refrigerating the dehumidified air to subzero temperatures;

A refrigerator for taking heat load from the refrigerator-contained items;

An impeller means drawing air out of the refrigeration chamber and into said heat exchanger;

A controlling means for regulating the flow of air into said turbine expander, and Said refrigerator including a refrigeration chamber and adjacent channel for delaying exit of the refrigerated air from said refrigerator.

4. An air-based refrigeration system comprising:

A series of dehumidification devices for sequential removal of oil and water vapor from compressed air;

An air heat exchanger for cooling the dehumidified air by refrigerated air;

A turbine expander for refrigerating the dehumidified air to subzero temperatures;

A refrigerator for taking heat load from the refrigeration-contained items;

An impeller means drawing air out of the refrigeration chamber and into said heat exchanger;

A controlling means for regulating the flow of air into said turbine expander, and Said refrigerator including a refrigeration chamber and an adjacent channel for delaying exit of the refrigerated air from said refrigerator;

Said channel guiding the refrigerated air exited from the refrigeration chamber into a wave-like path.

5. An air-based refrigeration system comprising:

A series of dehumidification devices for sequential removal of oil and water vapor from compressed air;

An air heat exchanger for cooling the dehumidified air by refrigerated air;

A turbine expander for refrigerating the dehumidified air to subzero temperatures;

A refrigerator for taking heat load from the refrigerator-contained items;

An impeller means drawing air out of the refrigeration chamber and into said heat exchanger;

A controlling means for regulating the flow of air into said turbine expander, and Said refrigerator including a refrigeration chamber and an adjacent channel for delaying exit of the refrigerated air from said refrigerator;

Said channel guiding the refrigerated air exited from the refrigeration chamber into a wave like path; and Said channel including a series of staggered fins forming said wave-like path.

6. An air-based refrigeration system comprising:

A series of dehumidification devices for sequential removal of oil and water vapor from compressed air;

An air heat exchanger for cooling the dehumidified air by refrigerated air;

A turbine expander far refrigerating the dehumidified air to subzero temperatures;

A refrigerator for taking heat load from the refrigerator-contained items;

An impeller means drawing air out of the refrigeration chamber and into said heat exchanger;

A controlling means for regulating the flow of air into said turbine expander;

Said refrigerator including a refrigeration chamber and an adjacent channel for delaying exit of the refrigerated air from said refrigerator;

Said heat exchanger cooling the incoming dehumidified air with the air coming from said refrigeration chamber.

7. An air-based refrigeration system comprising:

A series of dehumidification devices for sequential removal of oil and water vapor from compressed air;

An air heat exchanger for cooling the dehumidified air by refrigerated air;

A turbine expander for refrigerating the dehumidified air to subzero temperatures;

A refrigerator for taking heat load from the refrigerator-contained items;

An impeller means drawing air out of the refrigeration chamber and into said heat exchanger;

A controlling means for regulating the flow of air into said turbine expander, and Said refrigerator including a refrigeration chamber and an adjacent channel for delaying exit of the refrigerated air from said refrigerator; and Said refrigerator including an opening in a partition separating said channel from said refrigeration chamber.

8. A refrigeration system comprising:

A multiphase dehumidification means for removing oil and water vapor from said system;

Said dehumidification means including a moisture absorber and tap water cooling means;

A dust filter for catching absorber dust;

A heat exchanger for cooling the filtered and dehumidified air;

A turbine expander supplying refrigerated air;

A fan drawing air from a refrigerator, then compressing and evacuating said air out of the system; and Waste collection means for removing suspended particles from the refrigerator.

9. A refrigeration system of claim 8, and

Said dehumidification means including a moisture absorber being regenerated by hot air exiting from the subject system.

10. A refrigeration system of claim 8, and

Said dehumidification means including a dryer with a continuously compacted column of moisture absorbing material; and Said dryer including an entry and exit air chambers.

11. A refrigeration system of claim 8, and

Said fan and turbine sitting on the same shaft.

12. A refrigeration system of claim 8, and

Said refrigerator including a channel with a series of fins forming a sinusoidal path for the refrigerated airflow.

13. A refrigeration method comprising the following steps:

Compressing air with a standard compressor;

Cooling air with tap water lines in a pre-cooler for its dehumidification;

Separating water and oil droplets from the air by a moisture extractor;

Absorbing moisture in dryer including a moisture absorbing material;

Cooling the dehumidified air in a heat exchanger;

Producing refrigerated air in a turbine expander using the air cooled in the heat exchanger;

Extending the time of the refrigerated air presence in a refrigerator by guiding said air into a wave-like path between refrigerator channel fins;

Using the refrigerated air for cooling the dehumidified air in said heat exchanger;

Attenuating noise of the system by a muffler.

14. A refrigeration method of claim 13, and

Said moisture-absorbing material being regenerated by hot air moving in the reverse-to-normal direction from the exit chamber toward the entry chamber of the dryer.

15. A refrigeration method of claim 13, and

Filtering the dehumidified air with a dust filter removing suspended particles from the system prior to its entering said turbine expander.

16. A refrigeration method of claim 13, and

Compressing the refrigerated air by an impeller fan to increase its temperature and pressure; and Using hot air exiting the system for said absorbing material regeneration.

17. An air-based refrigeration system comprising:

A series of dehumidification devices for sequential removal of oil and water vapor from compressed air;

An air heat exchanger for cooling the dehumidified air by refrigerated air;

A turbine expander for refrigerating the dehumidified air to subzero temperatures;

A refrigerator for taking heat load from the refrigerator-contained items;

An impeller means drawing air out of the refrigeration chamber and into said heat exchanger;

A controlling means for regulating the flow of air into said turbine expander;

Said dehumidification devices comprising a pre-cooler for cooling compressed air with tap water;

Dryer means containing moisture-absorbing material;

Moisture separator means for blocking the entry of water and oil droplets into a compressed air line;

A dust filter for removing suspended particles from compressed and dehumidified air;

A muffler for noise attenuation of air prior to its exiting from the system;

A heater for drying moisture-absorbing material in said dryer;

A waste collection means for accumulating snowflakes and particles exiting from said refrigerator;

Said impeller means including a fan sitting on the same shaft with said turbine expander.

* * * * *